United States Patent
Mallette (10) Patent No.: US 7,184,787 B2
(45) Date of Patent: Feb. 27, 2007

(54) WIRELESS CONSOLE/CONTROL CONCENTRATOR

(75) Inventor: Michael J. Mallette, Apache Junction, AZ (US)

(73) Assignee: Sun Microsystems, Inc., Santa Clara, CA (US)

( * ) Notice: Subject to any disclaimer, the term of this patent is extended or adjusted under 35 U.S.C. 154(b) by 544 days.

(21) Appl. No.: 10/165,430

(22) Filed: Jun. 6, 2002

(65) Prior Publication Data

US 2003/0228874 A1    Dec. 11, 2003

(51) Int. Cl.
*H04B 7/00*    (2006.01)

(52) U.S. Cl. .................... 455/508; 455/404.2

(58) Field of Classification Search ........... 455/422.1, 455/435.1, 508, 561, 410, 411, 456, 404.2, 455/436, 456.1, 422, 414.2, 424, 457, 433
See application file for complete search history.

(56) References Cited

U.S. PATENT DOCUMENTS

| | | | | |
|---|---|---|---|---|
| 5,150,310 A | * | 9/1992 | Greenspun et al. | 342/451 |
| 6,721,572 B1 | * | 4/2004 | Smith et al. | 455/456.1 |
| 2001/0049282 A1 | * | 12/2001 | Ushiki et al. | 455/422 |
| 2002/0115454 A1 | * | 8/2002 | Hardacker | 455/457 |
| 2003/0036374 A1 | * | 2/2003 | English et al. | 455/403 |
| 2003/0117320 A1 | * | 6/2003 | Kim et al. | 342/457 |
| 2003/0142016 A1 | * | 7/2003 | Pickup | 342/387 |
| 2003/0220765 A1 | * | 11/2003 | Overy et al. | 702/158 |
| 2004/0203704 A1 | * | 10/2004 | Ommodt et al. | 455/422.1 |

* cited by examiner

*Primary Examiner*—Edward F. Urban
*Assistant Examiner*—Tu X. Nguyen
(74) *Attorney, Agent, or Firm*—Kent A. Lembke; William J. Kubida; Hogan & Hartson LLP (57) ABSTRACT

The invention is a method and apparatuses for a console/control concentrator utilizing a location based dynamic coordinate addressing network over a programmable pulse modulated wireless protocol such as TM-UWB™. The physical connections are wireless, which involves adding new hardware, designing TM-UWB™ devices into new devices, adding the software and firmware, the PLT and authentication, a standalone concentrator or the software to emulate a concentrator. The concentrator uses a built-in query language and an internal database to configure and map itself, and all the devices logically attached to it. It also uses the built-in query/language to dynamically add new devices within its range of operation. Once the wireless communication is established 'between console and concentrator, it can be broken if: the concentrator is rebooted or refreshed, the console refreshes or reboots the connection, the console moves location, the console experiences failure, or the console makes contact with an authorized override connection.

19 Claims, 5 Drawing Sheets

WIRELESS CONSOLE/CONTROL CONCENTRATOR

BACKGROUND OF THE INVENTION

1. Field of the Invention

The present invention relates primarily to the field of concentrators, and in particular to a method and apparatuses for a wireless console/control concentrator.

Portions of the disclosure of this patent document contain material that is subject to copyright protection. The copyright owner has no objection to the facsimile reproduction by anyone of the patent document or the patent disclosure, as it appears in the Patent and Trademark Office file or records, but otherwise reserves all rights whatsoever.

2. Background Art

In modern computing, devices like a group of computers share the same common resources or hardware devices in order to access the Internet, for example to browse the World Wide Web, to retrieve and send email, to chat, or to share a network, for example a Local Area Network/Wide Area Network (LAN/WAN). Some of these common resources include concentrators, routers, bridges, LAN/WAN connections, etc. A group of computers may also share other hardware devices like printers, facsimile machines, etc. In order to understand why devices and resources have to be shared, we have to first look at the changing nature of computing, and the implications thereof on layouts of computers in a shared environment like a computer lab, or business office.

Nature of Computing

The nature of computing is changing. Until recently, modem computing was mostly "machine-centric", where a user accessed a dedicated computer at a single location. The dedicated computer had all the data and computer programs necessary for the user to operate the computer, and ideally, it had large amounts of hardware, such as disk drives, memory, processors, and the like. With the advent of computing networks, however, not only different computers but also different computer layouts have become more desirable and the focus of computing has become "service-oriented". In particular computer networks allow a user to access data and computer programs that exist elsewhere in the network. When the user accesses such data or computer programs, the remote computer is said to be providing a service to the user. With the improvement in services and hardware devices available to users, the need to have a dedicated computer following the machine-centric paradigm is greatly reduced.

Console/Control Concentrator

A console/control concentrator is a hardware device that typically has many physical wire/fiber connections of the same type to devices within a very localized environment such as a computer rack or to those devices within a given short distance from the concentrator. It then relays data to and from these many localized hardwired devices (typically lower bandwidth, limited distance, and limited utilization) to typically (though not necessarily) a similar concentrator by multiplexing the data over a single (dual for redundancy) higher bandwidth line (typically connects to a LAN for greater distance). This allows installation and arrangement of many devices to be simplified by only having to make one or (two for redundancy) connections over a great distance instead of perhaps hundreds. Protocol conversion and routing can take place within a concentrator to allow for the multiplexing.

Figure 1:
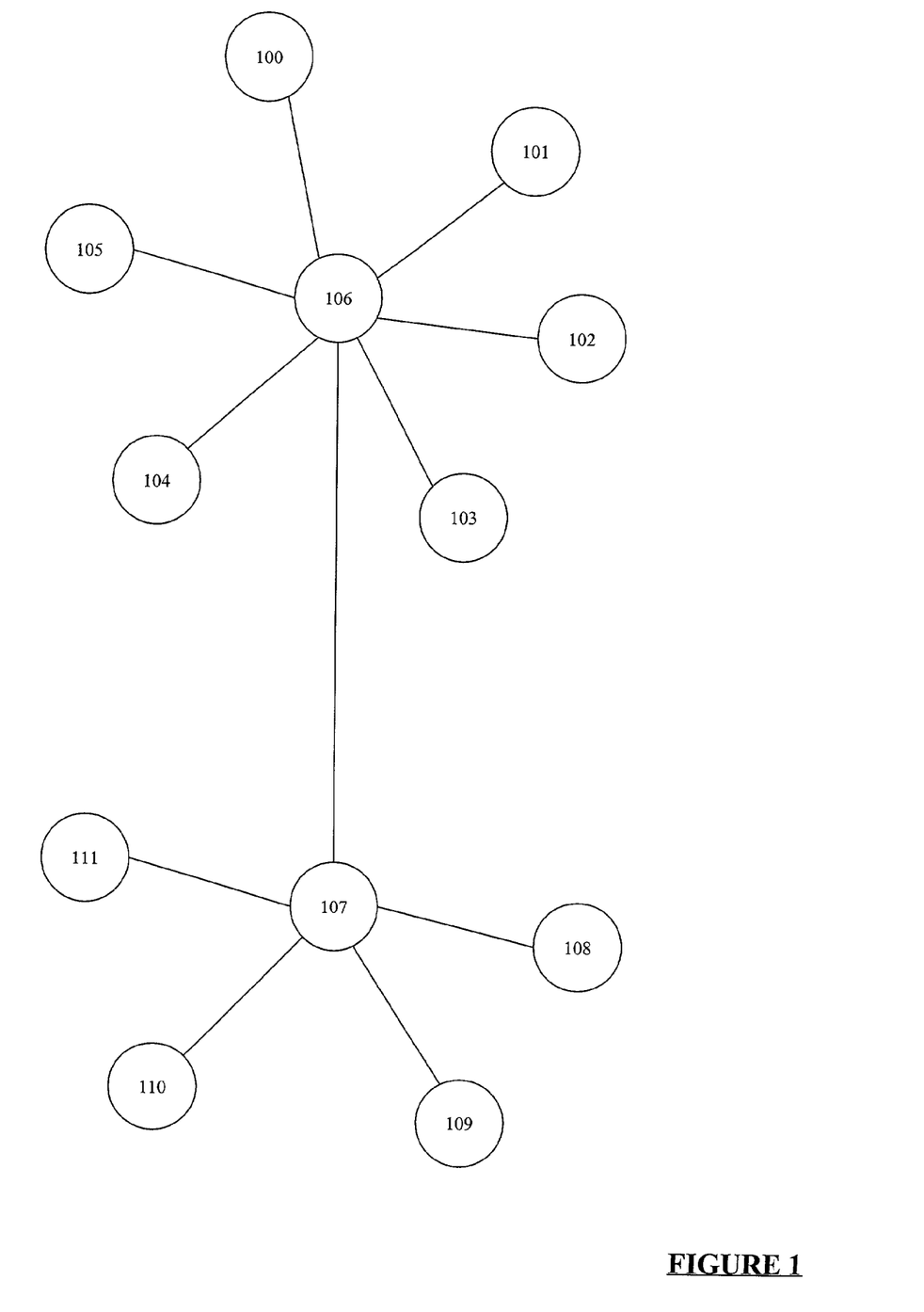
FIG. 1 is an illustration of a concentrator wired to several console port devices that is also wired to another concentrator (or terminal server), which is in turn wired to several consoles.

Present devices such as computers operating under various operating systems, and various communication protocols are hard-wired to a console/control concentrator. This is illustrated in FIG. 1, where various devices (device console ports 100, 101, 102, 103, 104, 105) are hard-wired to concentrator 106. Concentrator 106 is hard-wired to concentrator 107. Node 107 could be a network terminal server instead of another concentrator. Concentrator 107 is hard-wired to computer display consoles 108, 109, 110, 111. The connected ring shaped configuration is for illustration purposes only, and one skilled in the art will realize that the configuration can take any symmetric or non-symmetric shape depending upon the layout of the various devices in a room. Generally, for a room full of devices that use a concentrator to forward data to and from shared devices and resources, the devices are mounted on a rack, and there is one concentrator per rack or one per many such devices.

Computer Layout

Since several computers share the same resources or devices, they do not have to be close to each other, or to the shared devices, especially if they are hard-wired to each other. But, there may be a tangled maze of wires to and from these shared devices to the computers. For example, several computers from different parts of an office may be wired to a single common printer residing in one location of the office. Certain other wire connections are unavoidable, for example, the power cord from each device to the power outlet, or the console (monitor) connection to the computer tower. The present inventor has shown how these wire connections may be organized to a certain extent; especially for a room full of devices stacked one on top of another in rows of racks. A complete description of organizing and operating wires for rack systems are contained in co-pending U.S. patent application "Method and Apparatus For Efficient Electronics Positioning And Connection Systems", Ser. No. 09/784, 470, filed on Feb. 15, 2001, and assigned to the assignee of this patent application.

Prior Art Limitations

Existing console/control concentrators have a limited number of physical connections which; to a certain extent, is dictated by the size of the physical connector used, and the room needed to facilitate plugging and unplugging the physical connectors. This necessitates using many more concentrators thereby increasing the size and complexity of the job of wiring, configuring, documenting, labeling, and maintaining these many connections. Given the nature of console/control traffic, the vast majority of these connections will sit idle at any given time, meaning this hardware is for the most part underutilized.

The control ports of existing devices are usually either serial or Ethernet. Some devices have both types of access available. There are at least four different style connectors for serial and three different styles for Ethernet excluding fiber. These differences mean you will have to use adapters to compensate for the differences. Regardless, concentrators cannot work for both serial and Ethernet. They must be made for one or the other.

With current prior art there is a need to document each line with an ID tag on both ends as well as the need to document the layout of these wire connections in a network diagram. This documentation is updated manually in a documentation database as well as in an online configuration database. Because this process is manual and not automatic there is a great chance that the database will fall out of date with the actual configuration. This database could hold at a minimum the concentrator and device hostnames and the concentrator and device locations. Also, with prior art there is no means by which a computer room layout could be made self-documenting.

SUMMARY OF THE INVENTION

The present invention provides a method and apparatuses for a wireless console/control concentrator and associated hardware devices utilizing a location based dynamic coordinate addressing network over a programmable pulse modulated RF transceiver such as, for example, Time Modulated—Ultra Wideband (TM-UWB™). In one embodiment, the physical wire connections present in prior art between a device console port and a concentrator are replaced with wireless connections. This replacement involves retrofitting hardware on existing device consoles, building new devices with the wireless console/control hardware built-in, creation of a new wireless console/control concentrator, the three reference stations for PLT (positioning, location, tracking), and creation of the software programs that takes care of handling wireless communication and mapping of devices to their locations. In another embodiment, the concentrator acts as an intelligent router with its own built-in query/control language for configuration and use. In another embodiment, once the concentrator and a list of reference stations have been configured with their coordinates, and a coverage coordinate map is built, the concentrator can dynamically add new console/control points of presence (devices) within its designated range of coverage. In another embodiment, the concentrator communicates with a network terminal server over a dedicated wired/fiber network link. This terminal server can also serve as a network configuration control application software server, security and audit software application server, In yet another embodiment, once a connection has been established between a console and a console/control concentrator, it remains open until one of the following occur: the concentrator is rebooted or refreshed, the device side communicator reboots or re-establishes the connection, the console connection is dropped from the terminal server, or the device makes contact with an override connection which can either be a physical console port connection or a wireless port connection made from within a prescribed radius suitable for a maintenance console.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention is a method and apparatuses for a wireless console/control concentrator utilizing a location based dynamic coordinate addressing network over a programmable pulse modulated wireless transceiver such as, for example, TM-UWB™. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Wireless Console/Control Concentrator

Figure 2:
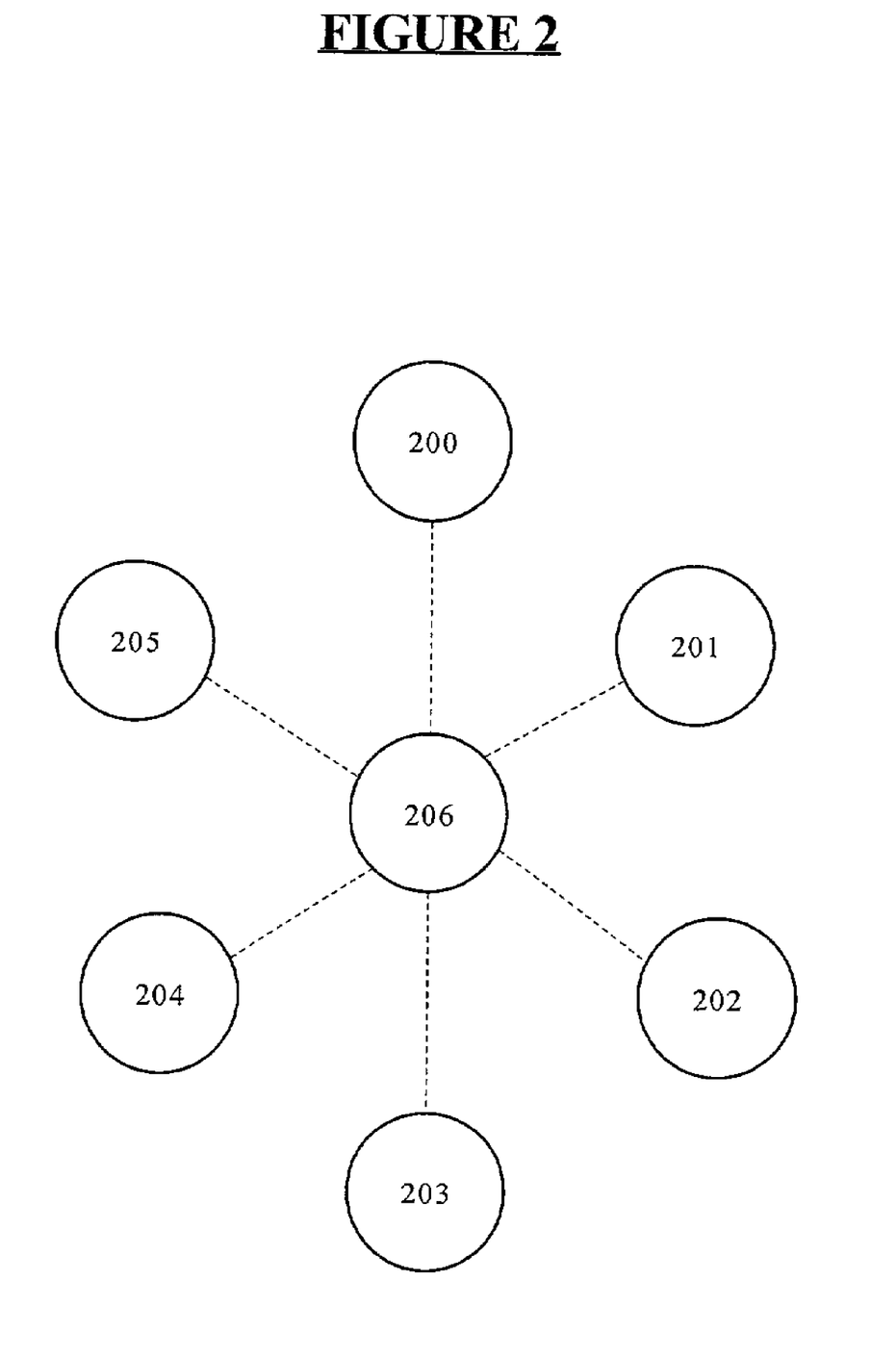
FIG. 2 is an embodiment of the invention illustrating a wireless connection between a concentrator and several consoles.

Consoles and other devices that share common resources like a network, for example the Internet, a Local Area Network (LAN), a Wide Area Network (WAN), or other devices like printers and facsimile machines, etc., are connected to each other via concentrators that act as forwarding agents and device location identifiers. Wireless concentrators are similar to the ones currently available, with one difference. All devices or consoles connected to the concentrators are by means of wireless connections using, for example, TM-UWB™ over a location based dynamic coordinate addressing network. This wireless connection is illustrated in FIG. 2. Here several different devices (computers 200 and 201, printers 202 and 203, and Ethernet switches 204 and 205) are connected via a wireless connection (indicated by the dashed line) to a concentrator 206. The ring shaped configuration is for purposes of illustration only, and one skilled in the art will realize that the shape can change depending upon the configuration of the devices in a room.

The concentrator acts as an intelligent router with a built-in query/control language and internal database for configuration, communication, and mapping of devices to their locations. In one embodiment of the invention, hardware utilizing, for example, a TM-UWB™ transceiver is installed in existing devices permitting them to communicate with other devices via a concentrator using wireless technology. In another embodiment of the invention, concentrator software may be installed in an existing computer along with the TM-UWB™ transceiver to create a concentrator that will permit consolidation of the concentrator into a network terminal server, and device management server. In another embodiment of the invention, the concentrator and the wireless console devices utilize TM-UWB™ reference stations for Position, Location, Tracking (PLT) data used by the location based dynamic coordinate network.

Before we discuss the details of this wireless connection, it is intuitive to discuss the Time Modulated—Ultra Wideband or TM-UWB™ technology used in the wireless connections of the present invention.

TM-UWB™

Wireless communication using the wireless protocol TM-UWB™ by the Time Domain Corporation requires no assigned spectrum of the wireless communication frequency because transmissions are pulse trains of individual ultra-wideband pulses sent at very precise time but varying intervals that resemble Morse code. This results in a very low average power transmission that creates a noise-like signal that can be used to transmit data, voice, and video communications. It can also be used as a tracking and positioning device as well as for radar. Because of the unique nature of TM-UWB™ signals, multi-path interference is eliminated. This makes TM-UWB™ ideal for indoor communications use in crowded electrically noisy environments such as computer rooms. The pulse trains can be channelized to create a multiple access system. Pseudorandom noise codes (PN codes) are used to accomplish this. A TM-UWB™ system can have virtually an unlimited number of channel codes. Each user would have a unique PN code sequence and only receivers using the same PN code sequence can decode the transmission. This can make eavesdropping or spoofing extremely difficult. TM_UWB™ also has a built-in location and tracking mechanism that is utilized in the present invention by the concentrator to map itself and all the devices connected to it on a Cartesian coordinate space or map. This permits accuracy to sub-centimeter but for this application the accuracy will be less than six inches. This feature of TM-UWB™ also helps in registering a new device to a concentrator when it has to be dynamically added to the network.

Cartesian Map

Figure 3:
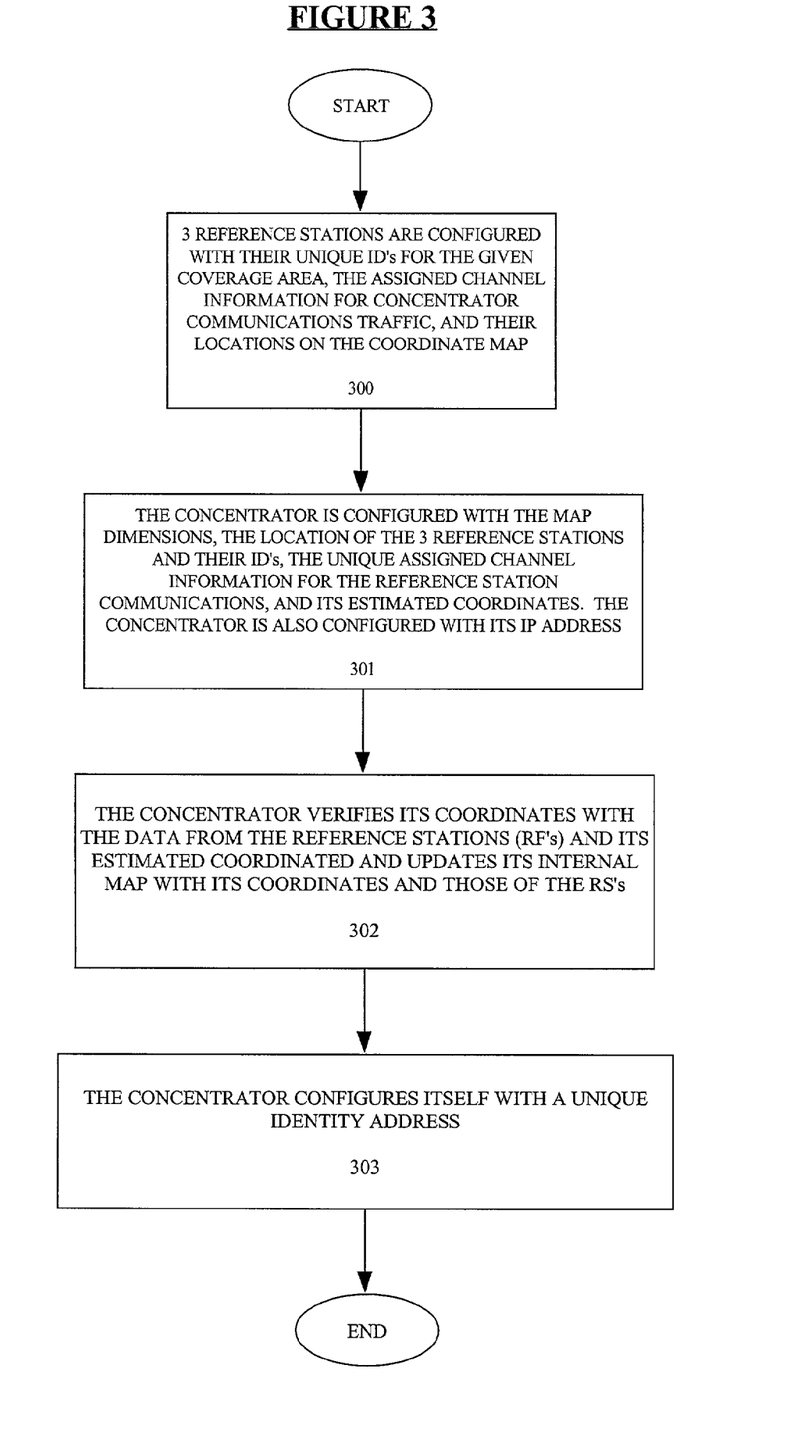
FIG. 3 is an embodiment of the invention that shows a flowchart of a concentrator mapping and registering of reference stations.

FIG. 3 is a flowchart that illustrates an embodiment of the invention where at step 300, 3 Reference Stations are configured with their unique identities for a given coverage area along with the assigned channel information for concentrator communications traffic and their locations on the coordinate map. At step 302, the concentrator is configured by mapping its location on a Cartesian map. This map is a three-dimensional grid showing the horizontal and vertical distances of the concentrator from its boundary limits as well as the other devices connected to it. For example, if the concentrator has a range of operation for a room of size 10'×10'×10', and is placed in the center of this range at a height of 3' from the floor, its location on the Cartesian map would be (5, 5, 3), while a device placed at one corner of the range at a height of 4' from the ground may have a mapping of (0, 0, 4) on the Cartesian map. Since the concentrator uses a wireless protocol such as TM-UWB™, it can map the location of a device precisely within a few inches because of the built-in location and tracking mechanism discussed above. The concentrator maps its location (step 302) based on input from the three Reference Stations placed within the map coordinates and whose locations and identifications are fixed and known (step 301). Once the concentrator has mapped itself on this grid (step 302), the concentrator is configured with a unique identity address that may be used to authenticate the concentrator (step 303).

Figure 4:
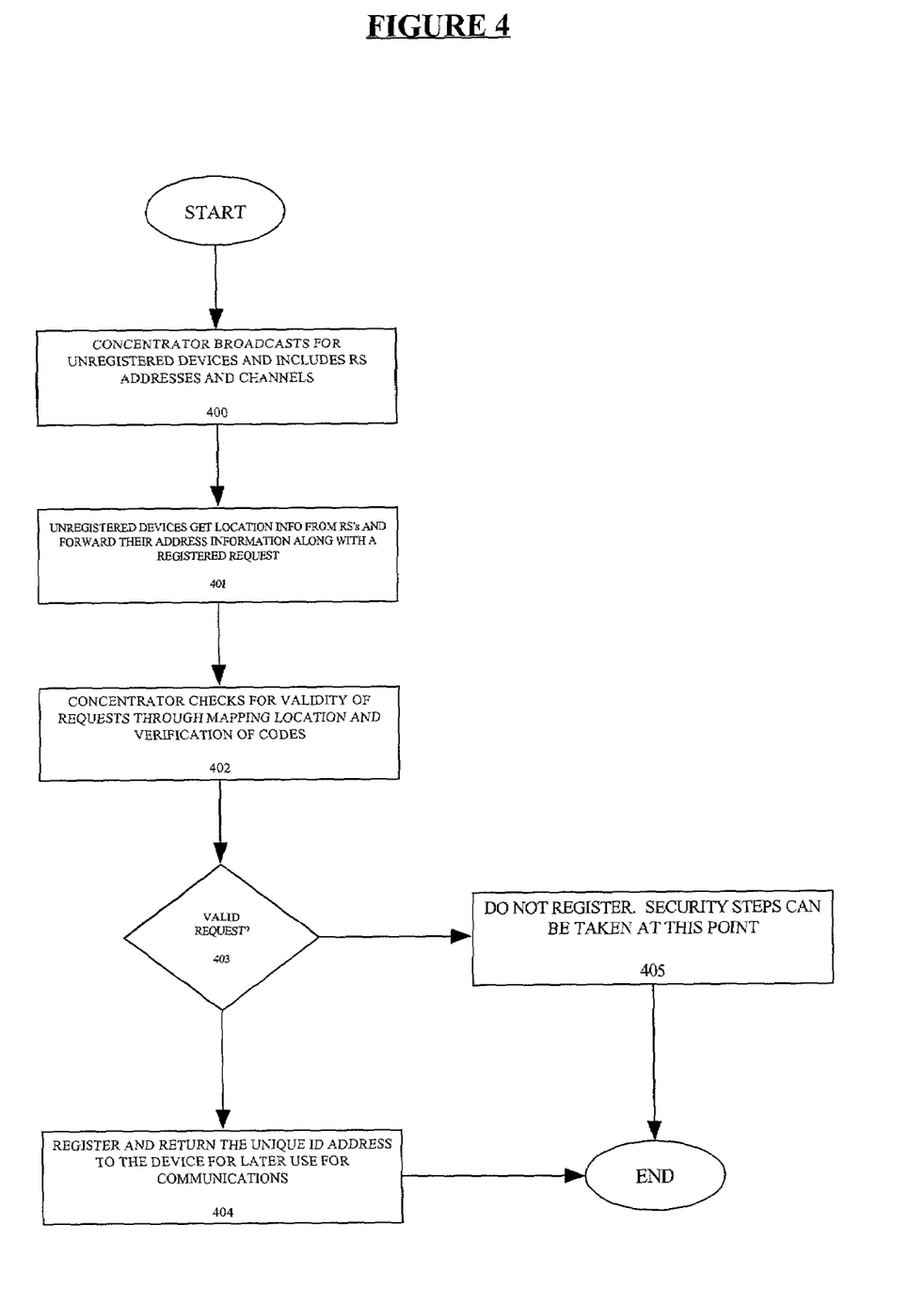
FIG. 4 is an embodiment of the invention that shows a flowchart of a console port device being registered to a concentrator.

The concentrator is now ready to address devices within its map area, and is illustrated in FIG. 4. According to another embodiment of the invention, the concentrator registers each device logically attached to it by broadcasting periodically for unregistered devices. Registration involves broadcasting for unregistered devices (step 400), receiving registration requests (step 401), checking the validity of the requests (steps 402, 403), adding the devices along with their unique identification address and coordinates on the Cartesian map to an internal database and returning a unique id to the device for later communications use (step 404).

Once the devices are registered, the concentrator knows the addresses and locations of all the devices and can through periodic polling dynamically add new devices to the system as long as the coordinates of the new devices are not cataloged in the internal database, and the new devices are within the service range of the concentrator. This can be altered by modifications to the address scheme to allow for multiple small devices to occupy the same physical space.

The invention keeps the ability for the devices to be hard-wired to a portable console in case the wireless connection fails, needs repairs, or for convenience when performing hardware maintenance. This physical connection overrides the wireless connection, and is provided for redundancy. Another form of connection that the present invention permits to override the wireless connection is any wireless connection made within a predetermined override range from the console device. This range would generally be set very close (3 to 5 feet) for hardware maintenance by a wireless laptop console using, for example, a wireless protocol such as TM-UWB™.

Figure 5:
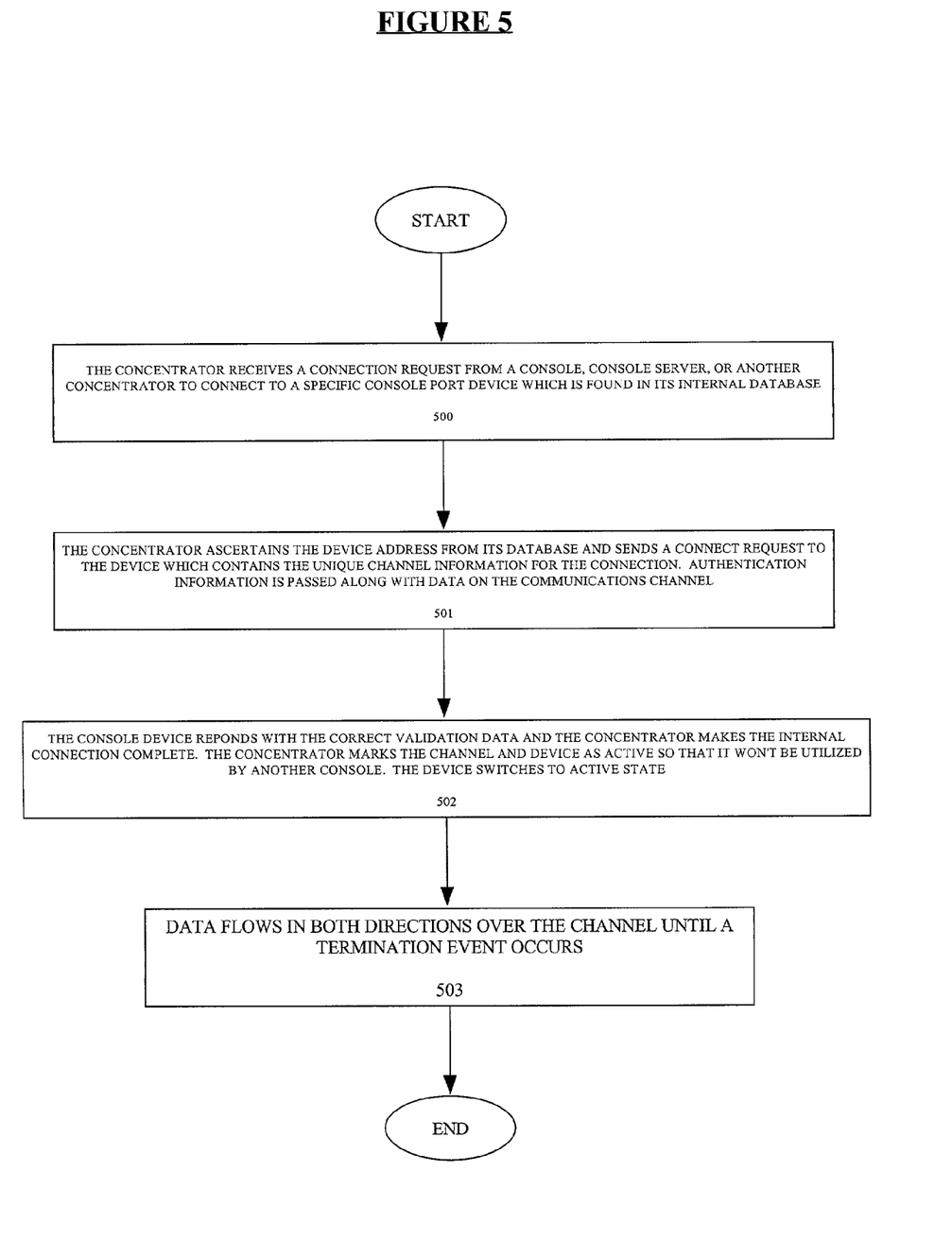
FIG. 5 is an embodiment of the invention that shows a flowchart of a wireless connection between a concentrator and a console port device.

FIG. 5 shows a flowchart depicting several causes for the wireless connection to be broken according to one embodiment of the present invention. At step 500, a request for connection to a specific device is received from a console, console server, or another concentrator by the concentrator. The request will be for a specific device found in the concentrator's internal database. At step 501, the concentrator ascertains the address of the console port device by checking in its internal database. Step 501 involves sending a connect request to the port device which also contains the unique communication channel information for the connection. At step 502 the authentication information of the console port device is passed along with data as header information on the communications channel. If authenticated the concentrator makes the connection complete and the concentrator marks the channel and device as active. The device itself is set to an active state. Finally, at step 503 the data and authentication information flows both directions until a termination event occurs.

CONCLUSION

By eliminating these wires and replacing them with wireless connections, the total number of wires to and from a hardware device like a concentrator is down to a minimum. This reduces the safety hazards associated with a tangled maze of wires, improves the aesthetic look of a room or a rack system full of computers and shared devices, and only allows devices registered to the concentrator to access a shared network of common resources and devices. Because of the nature of console/control network traffic, the number of active connections at any one time is generally far less than one percent of the available connections. Thus, a single wireless concentrator can in actuality service hundreds of times its actual bandwidth limitations and could conservatively replace the equivalent of 40,000 to 200,000 64 kbps duplex wired connections. This is thousands of times the current connection limit of today's largest console concentrators without the problems associated with wires.

With the ability to also dynamically register and plot the location within a large area all the devices under control of the concentrator, installation, control, monitoring, and maintenance of devices in a data center becomes greatly simplified and a task for automation by computer. Said computer and appropriate software could provide for dynamic creation of selective visual 3-D maps of a concentrators control area. Utilizing a protocol similar to SNMP, all forms of maps could be created like control, audit, layout, IP networks, machine types, ownership, inventory, and security from the various console devices in the control area.

Thus, a method and apparatus for a wireless console/control concentrator utilizing a location based dynamic coordinate addressing network over a programmable pulse modulated RF transceiver such as TM-UWB™ is described in conjunction with one or more specific embodiments. The invention is defined by the following claims and their full scope of equivalents.

I claim:

1. A method for a console/control concentrator to communicate via a wireless connection with a plurality of device consoles/control ports comprising:
    registering said plurality of device consoles/control ports based on their physical location as determined by said console/control concentrator based on location information collected by said device consoles/control ports from reference stations;
    adapting said device consoles/control ports to handle said wireless communication; and
    emulating a concentrator by utilizing a computer equipped with a transceiver and concentrator emulation application utilizing a Time Modulated—Ultra Bandwidth wireless protocol,
    wherein said console/control concentrator provides for verified device consoles/control ports locations using PLT by tri-lateralation, reference stations, and pseudo-random noise codes.

2. The method of claim 1 wherein said registration further comprises:
    receiving registration requests from unregistered console devices/control ports including the location information;
    checking the validity of said registration requests including mapping said unregistered console devices/control ports on a three dimensional coordinate system map, the three dimensional coordinate system map including a mapped location of the console/control concentrator;
    when validated, adding said console devices/control ports along with their unique identification address and coordinates on the three dimensional coordinate system map; and
    returning unique identifications to each of said device consoles/control ports for later communications use.

3. The method of claim 1 wherein said communication link is not limited to a fixed bandwidth or number of channels.

4. The method of claim 1 wherein said tri-lateralation uses a time of flight of data carrier pulse stream.

5. The method of claim 1 wherein said wireless connection is defined to exist within a range of operation, which can be specified to fall within a predetermined three-dimensional coordinate system.

6. The method of claim 5 wherein said predetermined three dimensional coordinate system is a boxed-out area of a room.

7. The method of claim 1 wherein said console/control concentrator acts as an intelligent router with a built-in query/configuration language and software for configuration.

8. The method of claim 7 wherein said console/control concentrators said built-in query/configuration language is used to define said predetermined three-dimensional coordinate system map.

9. The method of claim 7 wherein said console/control concentrator uses said bulk-in query/control language to dynamically configure and store the location of said device consoles/control ports within said three-dimensional coordinate system map.

10. The method of claim 9 wherein said step to configure and store the location of said device consoles/control ports uses PLT technology associated with TM-UWB™.

11. The method of claim 2 wherein said three-dimensional coordinate system map is part of an internal database of said console/control concentrator.

12. The method of claim 7 wherein said built-in software allows said console/control concentrator to add device consoles/control ports, and their coordinates within said range of operation to said internal database of said console/control concentrator.

13. The method of claim 7 wherein said built-in software allows said console/control concentrator to maintain a periodic updating of its internal database with said locations of all device console/control ports within said concentrators range of control.

14. The method of claim 7 wherein said built-in software allows said console/control concentrator to maintain a periodic updating of its internal database with said connection states of all device console/control ports within said concentrator's range of control.

15. The method of claim 1 wherein said wireless connection does not remain valid when one of the following occur:
    said console/control concentrator is rebooted;
    said console/control concentrator is refreshed;
    said device consoles/control ports reboots;
    said device consoles/control ports refreshes said wireless connection;
    said console/control concentrator changes location;
    said console/control concentrator experiences failure; or
    said device consoles/control ports make contact with a predefined and authorized override connection.

16. The method of claim 15 where said contact with said predefined and authorized override connection is known and monitored by said console/control concentrator.

17. The method of claim 15 wherein said predefined and authorized override connection is wireless or hard-wired.

18. A method for a console/control concentrator to communicate via a wireless connection with a plurality of device consoles/control ports comprising:
    registering said plurality of device consoles/control ports based on their physical location as determined by said console/control concentrator, wherein the console/control concentrator determines its three dimensional location based on input from three or more reference stations located within a range of operation of the console/control concentrator and wherein the registering comprises:
    receiving registration requests from said unregistered device consoles/control ports including location information;
    determining a three dimensional location of each of the unregistered device consoles/control ports including coordinates based on the location information, where in the determining comprises processing position, location, tracking (PLT) data from the reference stations;
    checking the validity of said registration requests based on the determined three dimensional locations;
    when validated, adding said console devices/control ports along with a unique identification address and the coordinates on a three dimensional coordinate system map; and
    emulating the concentrator by utilizing a computer equipped with a transceiver and concentrator emulation application utilizing a wireless protocol based on transmission of pulse trains.

19. The method of claim 18, wherein said registration further comprises:
    broadcasting periodically by said console/control concentrator for unregistered device consoles/control ports; and
    returning unique identifications to each of said device consoles/control ports for later communications use.

* * * * *

UNITED STATES PATENT AND TRADEMARK OFFICE
CERTIFICATE OF CORRECTION

PATENT NO. : 7,184,787 B2  Page 1 of 1
APPLICATION NO. : 10/165430
DATED : February 27, 2007
INVENTOR(S) : Michael Mallette

It is certified that error appears in the above-identified patent and that said Letters Patent is hereby corrected as shown below:

Column 7, line 56, "bulk-in" should be --built-in--

Column 8, line 7, "concentrators" should be --concentrator's--

Signed and Sealed this

Twenty-ninth Day of May, 2007

JON W. DUDAS
*Director of the United States Patent and Trademark Office*